United States Patent [19]

Nishio et al.

[11] Patent Number: 4,505,564
[45] Date of Patent: Mar. 19, 1985

[54] ROTATION CONTROL MECHANISM FOR DIAPHRAM-OPERATING RING IN INTERCHANGEABLE OBJECTIVE FOR PHOTOGRAPHIC CAMERA

[75] Inventors: Etsuro Nishio; Zenichi Okura, both of Tokyo, Japan

[73] Assignee: Asahi Kogaku Kogyo Kabushiki Kaisha, Tokyo, Japan

[21] Appl. No.: 520,724

[22] Filed: Aug. 5, 1983

[30] Foreign Application Priority Data

Aug. 16, 1982 [JP] Japan .................... 57-123842[U]

[51] Int. Cl.³ ............................................. G03B 9/02
[52] U.S. Cl. .................................................. 354/270
[58] Field of Search ............................ 354/270–274; 350/449, 450

[56] References Cited

U.S. PATENT DOCUMENTS 2,878,738  3/1959  Uhland .......................... 354/270
3,135,185  6/1964  Grosjean ........................ 354/270

FOREIGN PATENT DOCUMENTS 1086993  8/1960  Fed. Rep. of Germany ...... 354/270
227093   1/1969  U.S.S.R. .......................... 354/270

Primary Examiner—John Gonzales
Attorney, Agent, or Firm—Christie, Parker & Hale

[57] ABSTRACT

An interchangeable objective with a variable lens aperture for a photographic camera has a stationary support member and a diaphragm-operating member that is rotatable about an axis between first and second angular positions relative to the stationary support member. A first spring-loaded locking pin is located in the stationary member in a first plane perpendicular to the axis. A second spring-loaded locking pin is located in the stationary member circumferentially spaced at an angle to the first pin about the axis and in a second plane perpendicular to the axis. The second plane is spaced from the first plane in the direction of the axis. As a result, the distance between locking pins is greater than the angular distance of rotation of the diaphragm-operating member between the end of the M-range and the A-position. A locking groove is formed in the diaphragm-operating member so as alternatively to receive the first and second spring-loaded pins in locking engagement when the diaphragm-operating member is positioned at the first and second angular positions, respectively. An unlocking button is mounted in the diaphragm-operating member over the locking groove to push the respective first and second pins out of engagement with the locking groove upon depression of the unlocking button.

6 Claims, 16 Drawing Figures

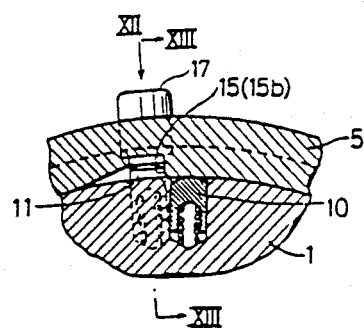
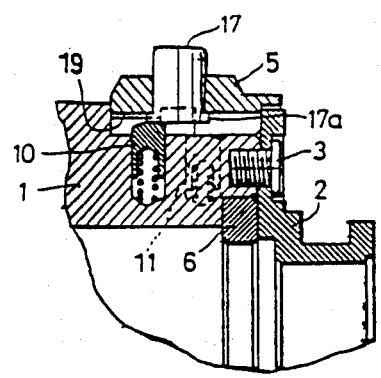
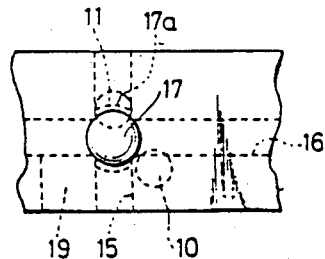
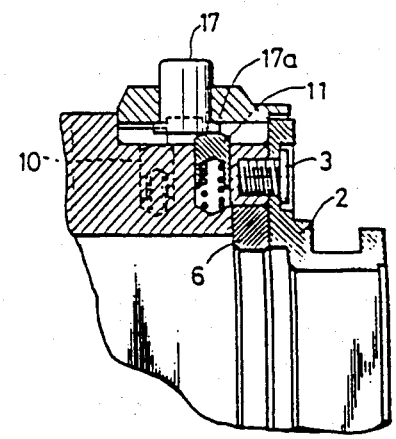

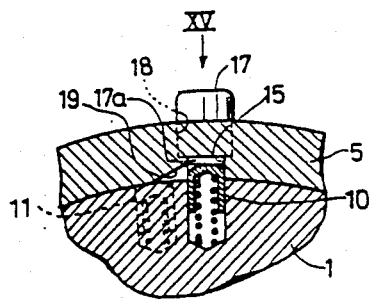
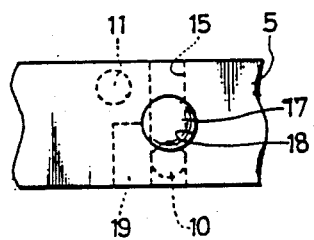
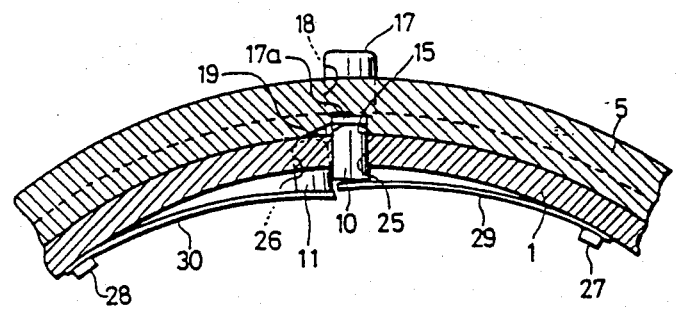

ROTATION CONTROL MECHANISM FOR DIAPHRAM-OPERATING RING IN INTERCHANGEABLE OBJECTIVE FOR PHOTOGRAPHIC CAMERA

CROSS REFERENCE TO RELATED APPLICATIONS

This application is related to application Ser. No. 520,723, filed on even date herewith by Yoshihiro Hama, the disclosure of which is incorporated fully herein by reference.

BACKGROUND OF THE INVENTION

The present invention relates to an interchangeable objective provided with a diaphragm-operating ring which is rotatable between a rotatable range for diaphragm preset and a position for automatic diaphragm regulation, and, more particularly, to a rotation control mechanism in such a ring for changeover between the rotatable range for diaphragm preset and the position for automatic diaphragm regulation.

A photographic camera of automatic exposure control type conventionally has a diaphragm priority mode in which a diaphragm value is preset by the user and a shutter speed for appropriate exposure is automatically regulated in the camera body, a shutter speed priority mode in which, inversely, a shutter speed is manually preset by the user and a lens aperture for appropriate exposure is automatically regulated, and a programmed mode in which a combination of diaphragm value and shutter speed is automatically regulated for appropriate exposure.

Interchangeable objectives used with a photographic camera adopting said three modes of automatic exposure control function or different exposure control functions must include a diaphragm-operating ring provided with a rotatable range for manually presetting the diaphragm value (referred to hereinafter as M-range) in said diaphragm priority mode and a position for automatic diaphragm regulation (referred to hereinafter as A-position) in said shutter speed priority mode and said programmed mode. Information as to whether the diaphragm-operating ring occupies the M-range or the A-position must be transferred to the camera body because different exposure control mechanisms are activated in these two cases.

Any unintentional changeover between the M-range and the A-position must be reliably prevented and, in consequence, a suitable changeover locking mechanism and unlocking mechanism are required. However, the structure peculiar to the lens barrel has made it difficult to obtain a large rotation angle for changeover between the end of the M-range and the A-position. This has given rise to various problems with respect not only to the strength of the objectives but also to the degree of freedom for their design.

SUMMARY OF THE INVENTION

According to the invention, a small rotation angle between the end of the M-range and the A-position is achieved comprising the strength of the objective or the degree of design freedom.

Specifically, an interchangeable objective with a variable lens aperture for a photographic camera has a stationary support member and a diaphragm-operating member that is rotatable about an axis between first and second angular positions relative to the stationary support member. A first spring-loaded locking pin is located in the stationary member in a first plane perpendicular to the axis. A second spring-loaded locking pin is located in the stationary member circumferentially spaced at an angle to the first pin about the axis and in a second plane perpendicular to the axis. The second plane is spaced from the first plane in the direction of the axis. As a result, the distance between locking pins is greater than the angular distance of rotation of the diaphragm-operating member between the end of the M-range and the A-position. A locking groove is formed in the diaphragm-operating member so as alternatively to receive the first and second spring-loaded pins in locking engagement when the diaphragm-operating member is positioned at the first and second angular positions, respectively. An unlocking button is mounted in the diaphragm-operating member over the locking groove to push the respective first and second pins out of engagement with the locking groove upon depression of the unlocking button.

BRIEF DESCRIPTION OF THE DRAWINGS

The features of specific embodiments of the best mode contemplated of carrying out the invention are illustrated in the drawings, in which:

FIGS. 8 through 10 show the diaphragm-operating ring in the lens barrel as held at the minimum lens aperture position within the M-range, FIG. 8 being a section of the pertinent part, FIG. 9 being a partial view as seen in the direction of an arrow IX in FIG. 8, and FIG. 10 being a section taken along the line X—X in FIG. 8;

FIGS. 11 through 13 show the diaphragm-operating ring in the lens barrel as held at the A-position, FIG. 11 being a section of the pertinent part, FIG. 12 being a partial view as seen in the direction of an arrow XII in FIG. 11 and FIG. 13 being a section taken along the line XIII—XIII in FIG. 11;

FIG. 14 is a section showing the pertinent part of another embodiment of the present invention;

FIG. 15 is a partial view as seen in the direction of an arrow XV in FIG. 14; and FIG. 16 is a section showing the pertinent part of further another embodiment of the present invention.

DETAILED DESCRIPTION OF THE SPECIFIC EMBODIMENTS

Figure 1:
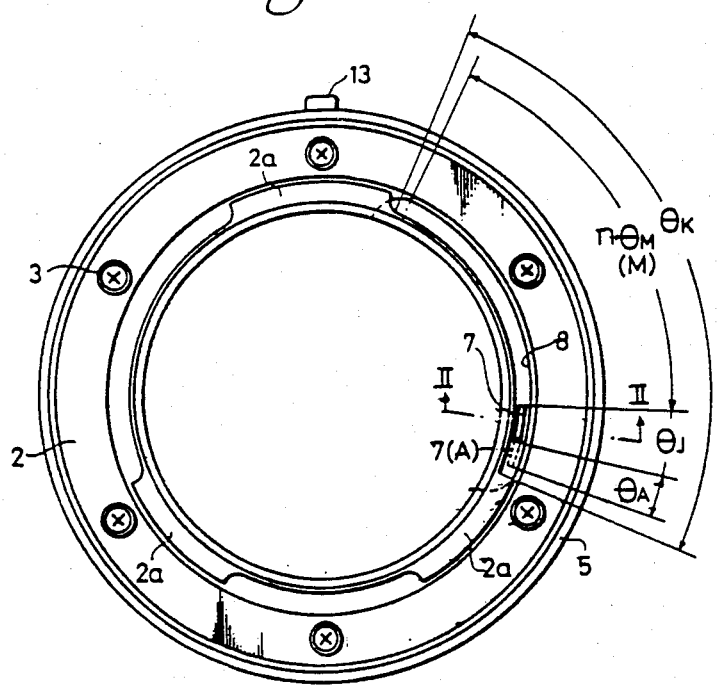
FIG. 1 is a rear view of an objective's barrel showing by way of example how the M-range and the A-position of a diaphragm-operating ring are arranged.
Figure 2:
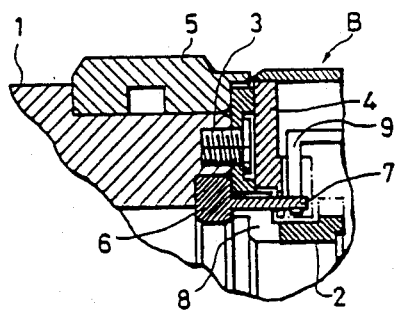
FIG. 2 is a section taken along the line II—II in FIG. 1, showing the objective's barrel of FIG. 1 as mounted onto a camera body.
Figure 3:
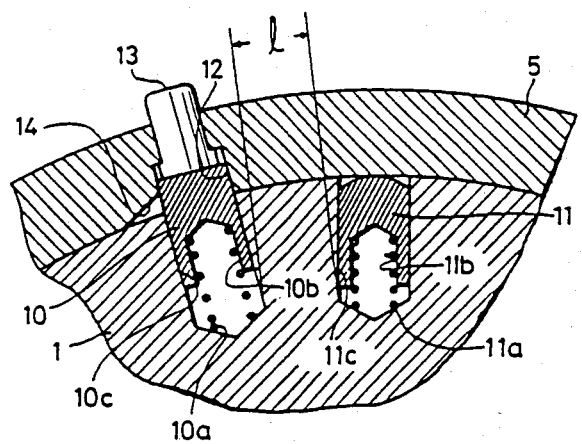
FIG. 3 is a section showing the pertinent part of the prior art mechanism for changeover between the M-range and the A-position.

In FIGS. 1 through 3, which describe prior art, a mount ring 2 is integrally connected by screws 3 to a stationary mount support ring so that this mount ring 2 is detachably engaged into a mount ring 4 provided on the camera body B. A diaphragm-operating ring 5 is rotatably mounted around the outer periphery of the mount support ring 1 and a diaphragm-rotating ring 6 adapted to be rotated integrally with this diaphragm-operating ring 5 is rotatably supported between said mount support ring 1 and the mount ring 2. The diaphragm-rotating ring 6 is provided with a diaphragm information transferring lever 7 projecting from a part of said diaphragm-rotating ring 6 and this diaphragm information transferring lever 7 extends through a circular arc notch 8 of the mount ring 2 toward the camera body B and engages with a diaphragm information receiving lever 9 provided within the camera body. The diaphragm information receiving lever 9 is operatively associated with a variable resistor (not shown) of an automatic exposure control circuit and generates an electric signal corresponding to the angular position of the diaphragm-operating ring 5. As represented in FIG. 1, the following information is given to the camera body: (1) whether diaphragm information transferring lever 7 lies within the M-range, i.e., the diaphragm preset, or on the A-position, and (2) what diaphragm value is assumed by said diaphragm information transferring lever 7 within the M-range.

Referring to FIG. 3 showing by way of example the well known changeover mechanism for changing over between the M-range and the A-position, the mount support ring 1 is provided at a position corresponding to one rotational end in the M-range (e.g., the minimum lens aperture) and at a position corresponding to the A-position with radially extending rotation control pins 10, 11 respectively, which are retractable and outwardly biased by compression coiled springs 10a, 11a, respectively. The diaphragm-operating ring 5 is provided in the inner surface with a locking groove 12 adapted to receive these rotation control pins 10, 11 and supports an unlocking button 13 adapted for inwardly displacing these pins 10, 11 against the biasing effect of said compression coiled springs 10a, 11a. Reference numeral 14 designates a tapered flank, i.e., a ramp, allowing rotation of the diaphragm-operating ring 5 within the M-range.

With such prior art changeover mechanism, it has been possible to assure good operation without any problem when the distance l between the rotation control pins 10, 11 (FIG. 1), i.e., the rotation angle for changeover between the M-range and the A-position is large. However, when the distance l is small, various problems are created such as insufficient strength of the rotation control pins 10, 11 and a restricted degree of freedom for the design.

Accordingly, the present invention provides an interchangeable objective in which the angle for changeover between the M-range and the A-position can be effectively reduced. Specifically, the mount support ring is provided respectively at the position corresponding to the one rotational end within the M-range and at the position corresponding to the A-position with two rotation control pins which are displaceable in the direction of the optical axis. Both rotation control pins can be resiliently biased into the locking groove formed in the diaphragm-operating ring, and said two rotation control pins can be depressed by the single unlocking member out of said locking groove to its initial position.

First, a procedure for determining the rotation angle for changeover between the M-range and the A-position and reasons why this angle should be made relatively small will be explained on the basis of specific numerical data. The rotatable range of the diaphragm information transferring lever 7 is limited by angle $\theta_k$ (FIG. 1) defined by the angle between each pair of adjacent claws 2a formed in the mount ring 2. This angle $\theta_k$ depends on factors as following:

(1) number of the claws 2a formed in the mount ring 2

The number of points necessary for definition of a plane is three and the number of the claws also is preferably three. Thus it is assumed here that three claws are formed in this embodiment.

(2) positions of the claws 2a in the mount ring 2

These three claws 2a should be positioned at irregular intervals, which permits the mount ring to be received in the mount ring of the camera body at only one angular position. However, putting these claws at irregular intervals tends to bring the optical axes of the objective and the camera body out of mutual alignment. To meet these mutually contradictory requirements, the claws 2a are arranged at intervals of 130°, 115°, and 115°.

(3) operating angle for mounting or detaching of objective and angular dimension of the claws The operating angle, i.e., the amount of rotation required for mounting the objective onto the camera body depends on the intervals at which the claws 2a are arranged. When the angular dimension of each claw on the objective corresponds to the angular dimension of each claw on the camera body, the angular dimension of the claw must be less than one half of said 130° or 115°, as the case may be. Accordingly, the operating angle for mounting or detaching the objective will be more than one-half or 130° or 115°, for example, 70° or 60°. The angular dimension of every claw will be 50° with an allowance of 5° for mounting the objective onto the camera body.

(4) angular dimension $\theta_k$ of the notch formed between the claws 2a

It is preferred that the diaphragm information transferring lever 7 is rotatable within a range as wide as possible. Thus, the notch 8 is formed between the pair of claws 2a which are arranged at an interval of 130°. The angle $\theta_k$ therefore corresponds to the interval between the claws minus the claw angular dimension, i.e., 130° − 50° = 80°.

The diaphragm information transferring lever 7 has its rotatable range of 75° with an allowance of 2.5° (circumference length of 1 mm with a radius of 23 mm) toward the maximum lens aperture and the A-position, respectively.

Within such range, the angle $\theta_k$ over which the diaphragm information transferring lever 7 can be rotated from the minimum lens aperture in the M-range to the A-position depends further upon the factor mentioned in the following paragraph.

(5) angle $\theta_J$ of the diaphragm information transferring lever 7 itself

The diaphragm information transferring lever must have a sufficient strength for exact transfer of diaphragm information. When such requirement is satisfied by a transferring lever having a circumferential length of 4 mm with a radius of 23 mm, the angle $\theta_J$ is obtained by $$\theta_J = \frac{4 \times 360°}{23 \times 2 \times \pi} = 10°$$

(6) number of steps n from the maximum lens aperture to the minimum lens aperture within the M-range The exposure control circuit in the camera body receives the diaphragm information within the M-range as the number of steps from the maximum lens aperture to an actually used diaphragm value (five steps when the maximum lens aperture is 1.4 and the actually used diaphragm value is 8). There are 9.5 steps for an objective having a maximum lens aperture of 1.2 and a minimum lens aperture of 32, so that such objective must be able to accommodate 10 steps, i.e., n=10.

(7) rotation angle $\theta_M$ of the diaphragm information transferring lever 7 per unit diaphragm value As the minimum unit of diaphragm information, $\frac{1}{3}$ step must be reliably transferred to the exposure control circuit. Assuming that this requirement is satisfied with a circumferential displacement of the variable resistor of 1 mm, said variable resistor having a radius of 28 mm, $\frac{1}{3}\theta_M$, the rotation angle corresponding to $\frac{1}{3}$ step is obtained by $$\tfrac{1}{3}\theta_M = \frac{1 \times 360°}{28 \times 2 \times \pi} = 2°$$

Accordingly, the rotation angle $\theta_M$ of the diaphragm information transferring lever itself per unit diaphragm value is 6°.

(8) rotation angle $\theta_A$ of the diaphragm information transferring lever 7 from the minimum lens aperture to the A-position within the M-range
$\theta_A = 75° - \theta_J - n\theta_M$.
This gives
$\theta_A = 75° - 10° - 10 \times 6° = 5°$.

Thus the rotation angle $\theta_A$ is limited to an angle as small as 5°. Assuming that, in the prior art mechanism as shown in FIG. 3, the rotation control pins 10, 11 are formed with holes 10b, 11b respectively having diameters of 1.5 mm to receive the compression coiled springs 10a, 11a, respectively, said pins 10, 11, must have diameters of at least 2 mm. With the diaphragm-operating 5 having an inner radius of 28 mm, and holes 10c, 11c adapted to receive the pins 10, 11, respectively, which are 3 mm deep, the distance l between said holes 10c and 11c is obtained by $$l = \frac{(28 - 3) \times 2 \times \pi}{360°} \times 5 - 2 = 0.2 \text{ mm}$$

when $\theta_A$ is 5°. If $\theta_A$ is so limited to 5°, the distance between the holes 10c and 11c is 0.2 mm at the narrowest position. In consequence, there is a danger that these holes 10c, 11c formed in the mount support ring 1 might be destroyed, for example, as the user violently rotates the diaphragm-operating ring 5 when the objective is mounted on the camera body.

Figure 4:
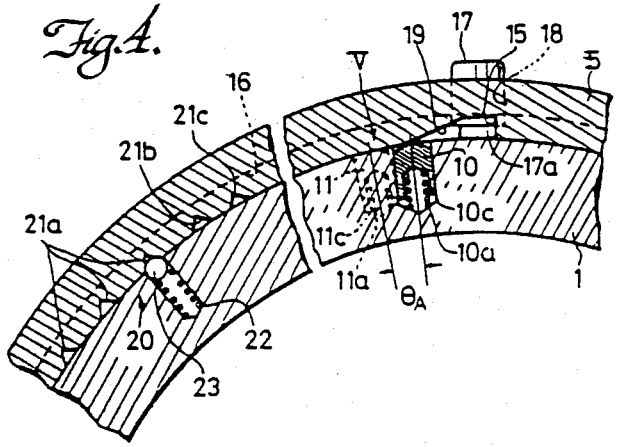
FIG. 4 is a section showing the pertinent part of the mechanism in an embodiment of the present invention.
Figure 5:
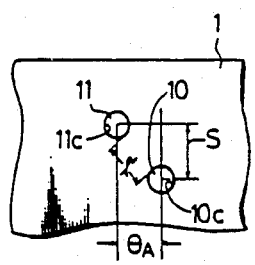
FIG. 5 is a view of part of a diaphragm-operating ring as seen in the direction of an arrow V in FIG. 4.
Figure 6:
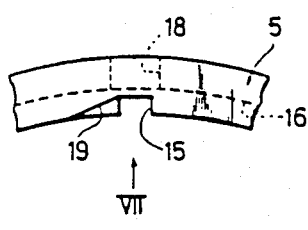
FIG. 6 is a front view showing the pertinent part of the diaphragm-operating ring.

According to the present invention, the two rotation control pins 10, 11 are spaced from each other in the direction of the optical axis, as seen in FIGS. 4 and 5, so as to give the mount support ring 1 sufficient strength, even when the angle $\theta_A$ is as small as mentioned above. Specifically, the mount support ring 1 is provided at positions circumferentially spaced from each other by an angular distance corresponding to the rotation angle for changeover between the M-range and the A-position set as above mentioned and by a distance S in the direction of the optical axis also with two radial pin guide holes 10c, 11c adapted to receive the associated rotation control pins 10, 11 which are, in turn, outwardly biased under action of the compression coiled springs 10a, 11a, respectively.

The diaphragm-operating ring 5 is provided along its inner peripheral surface with a locking groove 15 extending in the direction of the optical axis to receive said rotation control pins 10, 11. This locking groove 15 is separated by a circumferential relief groove 16, which is necessary for machining, into a groove portion 15a and a groove portion 15b adapted to receive said rotation control pin 10 and said rotation control pin 11, respectively. There is formed a guide hole 18 radially extending through the diaphragm-operating ring 5 at the intersection of said locking groove 15 and said relief groove 16 for slidably guiding an unlocking button 17, which is, in turn, provided at the bottom with an extension place 17a extending transverse to the unlocking button over the two rotation control pins and lying within the locking groove 15 so that the plate 17a may bear against the heads of said two rotation control pins 10, 11, respectively.

The rotation control pins 10, 11 serve the same function previously mentioned in reference to the well known embodiment, to hold the diaphragm-operating ring 5 against one rotational end (the minimum lens aperture) in the M-range when the pin 10 is received in the locking groove portion 15a and to hold said diaphragm-locking operating ring at the A-position when the other pin 11 is received in the locking groove portion 15b. Said locking groove portion 15a is formed with a tapered flank 19 allowing rotation of the diaphragm-operating ring 5 toward the maximum lens aperture of the M-range.

As shown in FIG. 4, there is provide a click-stop mechanism 20 between the diaphragm-operating ring 5 and the mount support ring 1. In this mechanism, the diaphragm-operating ring 5 is provided in the inner peripheral surface with click-grooves 21a corresponding to diaphragm value graduations other than the minimum lens aperture, a click-groove 21b corresponding to the minimum lens aperture and a click groove 21c corresponding to the A-position graduation, while the mount support ring 1 is provided with a click-ball 23 adapted to be received in these click-grooves under a biasing effect of a compression coiled spring 22. It will be understood that the rotation control pin 10 is received in the locking groove 15 when the click-ball 23 is received in the click-groove 21b and the rotation control pin 11 is received in the locking groove 15 when said click-ball 23 is received in the click-groove 21c. The mechanism by which the lens aperture is adjusted by rotation of the diaphragm-operating ring 5 is well known and constitutes no part of the present invention. Thus, such mechanism will not be described in detail.

Figure 8:
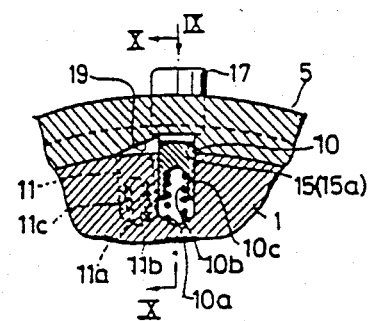
Figure 7:
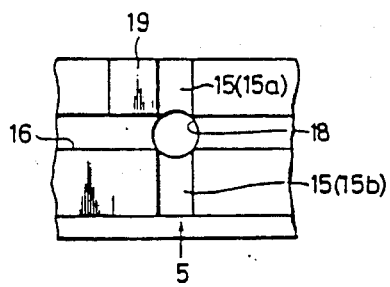
FIG. 7 is a view of part of the diaphragm-operating ring as seen in the direction of an arrow VII in FIG. 6.
Figure 9:
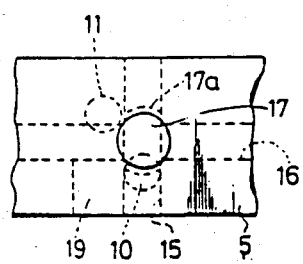

With the interchangeable objective constructed according to the present invention as has been described above, the changeover from the M-range to the A-position can be achieved by depression of the unlocking button 17. Such changeover from the M-range to the A-position never occurs so long as said unlocking button 17 is not depressed. When the diaphragm-operating ring 5 is rotated to the minimum lens aperture within the M-range, the rotation control pin 10 is received in the locking groove 15 (more specifically, the groove portion 15a) as seen in FIGS. 8 through 10, and thereby said diaphragm-operating ring 5 is prevented from being further rotated. For rotational adjustment to the A-position, the unlocking button 17 is depressed so as to retract the rotation control pin 10 out of the locking groove 15a and then the diaphragm-operating ring may be rotated to the A-position. Then the rotation control pin 11 is received in the locking groove 15 (more specifically, the groove portion 15b), and thereby the diaphragm-operating ring 5 is prevented from rotating toward the M-range (as seen in FIGS. 11 through 13). Changeover from the A-position to the M-range can also be achieved by a similar operation.

The rotation control pins 10, 11 are spaced from each other in the direction of the optical axis according to the present invention, so that the mount support ring 1 maintains the desired strength even when there is available a very small rotation angle for changeover between the M-range and the A-position. Assuming that such rotation angle $\theta_A$ for changeover is 5° and the rotation control pins 10, 11 having diameters of 2 mm are spaced from each other by 3 mm center-to-center in the direction of the optical axis, while the diaphragm-operating ring 5 has its inner radius of 28 mm and the pin guide holes 10c, 11c are 3 mm deep, the minimum aceptable dimension l' between these guide holes 10c, 11c is obtained by $$l' = \sqrt{\left[\frac{(28-3) \times 2 \times \pi}{360} \times 5\right]^2 + 3^2} - 2 = 1.7 \text{ mm}.$$

This value is sufficient to maintain the desired strength of the mount support ring 1.

The embodiment as has been described hereinabove adopts formation of the tapered flank 19 on the diaphragm-operating ring 5, and, for convenience in machining such tapered flank 19, there is provided the circumferential relief groove 16. However, said circumferential relief groove 16 is not necessary, as seen in FIGS. 14 and 15, when the diaphragm-operating ring 5 including the grooves and flanks comprises a molded synthetic resin or a die cast piece. Biasing of the rotation control pins 10, 11 may be achieved also by, instead of the compression coiled springs, leaf springs 29, 30 fixed at one end by pins 27, 28 respectively, on the inner peripheral surface of the support ring 1 so that the free ends of said leaf springs 29, 30 depress against the lower end surfaces of the rotation control pins 10, 11 inserted into associated through-holes 25, 26 formed in the support ring 1, as shown in FIG. 16. It should be noted that the mount support ring 1, in accordance with the present invention, is a non-rotatable, i.e., stationary, member adapted for support of the diaphragm-operating ring 5.

The two rotation control pins used for changeover of the diaphragm-operating ring between the M-range and the A-position are speced from each other in the direction of the optical axis in accordance with the present invention. In this way, the supporting member for the diaphragm-operating ring, i.e., the mount support ring 1 can maintain the necessary strength even when the rotation angle for changeover is relatively small. Furthermore, the distance between these two rotation control pins as measured in the direction of the optical axis can be adjusted for every objective in consideration of factors such as the length of the diaphragm-operating ring as measured in the direction of the optical axis. The degree of freedom for design inclusive of dimensioning of the M-range is effectively improved.

What is claimed is:

1. An interchangeable objective with a variable lens aperture for a camera comprising:
   a stationary support member;
   a diaphragm-operating member rotatable about an axis between first and second angular positions relative to the stationary support member;
   a first spring loaded locking pin located in the stationary member in a first plane perpendicular to the axis;
   a second spring loaded locking pin located in the stationary member circumferentially spaced at an angle with the first pin about the axis and in a second plane perpendicular to the axis, the second plane being spaced from the first plane in the direction of the axis;
   a locking groove formed in the diaphragm-operating member so as alternatively to receive the first and second locking pins in locking engagement when the diaphragm-operating member is positioned at the first and second angular positions, respectively; and
   an unlocking button mounted in the diaphragm-operating member over the locking groove to push the respective first and second pins out of engagement with the locking groove upon depression of the unlocking button.

2. The interchangeable objective of claim 1, in which the first and second locking pins lie retractably in respective first and second bores formed in the stationary member, coil springs biasing the respective locking pins toward the diaphragm-operating member.

3. The interchangeable objective of claim 1, in which the first and second locking pins retractably lie in respective first and second bores formed in the support member, leaf springs biasing the respective pins toward the diaphragm-operating member.

4. The interchangeable objective of claim 1, in which the locking groove extends parallel to the axis spanning the distance between the first and second planes and the unlocking button has an extension plate in the locking groove sufficiently long to alternatively engage the first and second pins when the first and second pins lie in the locking groove.

5. The interchangeable objective of claim 4, in which the locking groove has a tapered flank on one side to permit the diaphragm-operating member to continue to rotate away from the second angular position when the locking groove receives the first locking pin, the first angular position representing one end of an M-range and the second angular position representing an A-position.

6. The interchangeable objective of claim 5, additionally comprising a plurality of click-grooves on one member and a click-ball on the other member that individually engages the click-grooves in the M-range depending on the lens aperture.

\* \* \* \* \*

UNITED STATES PATENT AND TRADEMARK OFFICE
CERTIFICATE OF CORRECTION

PATENT NO. : 4,505,564

DATED : March 19, 1985

INVENTOR(S) : Etsuro Nishio; Zenichi Okura

It is certified that error appears in the above-identified patent and that said Letters Patent is hereby corrected as shown below:

Column 6, line 30, "diaphragm-locking operating ring" should read -- diaphragm-operating ring --.

Column 8, line 5, insert the following paragraph:

-- The disclosure of Japanese Utility Model Application No. 1982-123842, Japanese Utility Model Gazette No. 59 (1984)-27530, laid open February 21. 1984, is incorporated fully by reference. --

Signed and Sealed this

Sixth Day of January, 1987

Attest:

DONALD J. QUIGG

Attesting Officer

Commissioner of Patents and Trademarks